United States Patent
Wu

(10) Patent No.: US 12,425,717 B1
(45) Date of Patent: Sep. 23, 2025

(54) PORTABLE MOBILE PHONE SCREEN-MIRRORING DISPLAY

(71) Applicant: Shenzhen Duomi Information Technology Co., Ltd., Guangdong (CN)

(72) Inventor: Longhui Wu, Guangdong (CN)

(73) Assignee: Shenzhen Duomi Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/224,683

(22) Filed: May 30, 2025

(30) Foreign Application Priority Data

May 22, 2025 (CN) .......................... 202510663147.7

(51) Int. Cl.
| | |
|---|---|
| *H04N 23/63* | (2023.01) |
| *G06F 3/14* | (2006.01) |
| *G06F 3/16* | (2006.01) |
| *G06T 3/60* | (2024.01) |
| *G10L 15/22* | (2006.01) |
| *H04M 1/72409* | (2021.01) |
| *H04N 23/62* | (2023.01) |

(52) U.S. Cl.
CPC ......... *H04N 23/631* (2023.01); *G06F 3/1454* (2013.01); *G06F 3/162* (2013.01); *G06T 3/60* (2013.01); *G10L 15/22* (2013.01); *H04M 1/72409* (2021.01); *H04N 23/62* (2023.01)

(58) Field of Classification Search
CPC . H04N 23/631; H04N 23/62; H04M 1/72409; G06F 3/1454; G06F 3/162; G06F 3/60; G10L 15/22

USPC ...................................................... 348/207.99
See application file for complete search history.

(56) References Cited

U.S. PATENT DOCUMENTS

| | | | |
|---|---|---|---|
| 7,881,743 B2 | 2/2011 | Griffin et al. | |
| 9,563,229 B2 | 2/2017 | Behar et al. | |
| 11,223,217 B2 * | 1/2022 | Brower | H02J 7/0042 |
| 11,880,628 B2 * | 1/2024 | Fan | G06F 3/1454 |
| 12,127,650 B1 * | 10/2024 | Mora | A45F 5/10 |
| 12,282,697 B2 * | 4/2025 | Niu | G06F 9/451 |
| 12,333,205 B2 * | 6/2025 | Agrawal | G06F 3/1423 |
| 12,373,157 B2 * | 7/2025 | Lee | G06F 3/1454 |
| 2016/0239250 A1 * | 8/2016 | Kim | G06F 3/1454 |

(Continued)

*Primary Examiner* — Pritham D Prabhakher
(74) *Attorney, Agent, or Firm* — Ying-Ting Chen

(57) ABSTRACT

The present invention relates to a portable mobile phone screen-mirroring display, which is adapted to wirelessly connect with a mobile phone to receive audio-visual screen-mirroring signals from the mobile phone, thereby functioning as a portable viewing screen or portable shooting monitor for the mobile phone, and comprises a processor module, and a display screen, a Wi-Fi module and a Bluetooth module communicatively connected to the processor module, the portable mobile phone screen-mirroring display is configured to receive audio-visual screen-mirroring signals from mobile phone exclusively through the Wi-Fi module, and to transmit control commands generated by the processor module back to the mobile phone exclusively through the Bluetooth module. Correspondingly, the Wi-Fi module receives the audio-visual screen-mirroring signals from the mobile phone and transmits the signals to the processor module, the processor module controls the display screen to perform screen mirroring based on the received signals.

20 Claims, 4 Drawing Sheets

(56) References Cited

U.S. PATENT DOCUMENTS

| | | | |
|---|---|---|---|
| 2020/0075176 A1* | 3/2020 | Menzel | G06F 3/1454 |
| 2022/0391161 A1* | 12/2022 | Fan | G06F 3/1454 |
| 2023/0297138 A1* | 9/2023 | Ahari Hashemi | G06F 1/1626 |
| | | | 455/575.8 |
| 2023/0350629 A1* | 11/2023 | Wang | H04N 21/44227 |
| 2024/0004603 A1* | 1/2024 | Qian | H04N 21/43637 |
| 2024/0005891 A1* | 1/2024 | Xu | G09G 5/02 |
| 2024/0419380 A1* | 12/2024 | Porter, Jr. | G06F 3/162 |
| 2025/0147711 A1* | 5/2025 | Agrawal | G09G 5/391 |
| 2025/0239235 A1* | 7/2025 | Lee | H04N 21/4858 |

\* cited by examiner

PORTABLE MOBILE PHONE SCREEN-MIRRORING DISPLAY

BACKGROUND OF THE PRESENT INVENTION

Field of Invention

The present invention relates to the field of screen mirroring displays, and more particularly to a portable mobile phone screen-mirroring display.

Description of Related Arts

As a culmination of industrial production and scientific technology, smartphones have become indispensable tools in people's daily lives, work, and studies. In addition to basic communication functions, smartphones are widely used for live streaming, photography, watching videos, gaming, online shopping, attending online classes, and navigation. However, the multipurpose design of smartphones inherently makes it difficult to meet the specific requirements of each use case. For example, when watching videos on smartphones, the screen size designed for portability often fails to meet large-screen viewing needs; when using a smartphone for live streaming or self-portraits, the screen and camera layout, designed for visual aesthetics with high screen-to-body ratios, make it difficult to use the high-performance rear camera while monitoring the shot in real-time.

To address these limitations, various smartphone accessories and connectivity software have been developed to cater to specific needs in different scenarios. For example, to meet the demand for large-screen viewing, current smartphone systems and video applications often feature screen mirroring functions, commonly used to project the app interface onto a television, enabling a larger viewing experience without interfering with smartphone usage. Similarly, during live streaming or taking selfies, users may opt for external webcams from the above-mentioned accessories to monitor the video feed while ensuring high image quality. However, for outdoor viewing needs, such as the needs of children to watch videos during travel, handing over the phone to the child leads to the device being out of the parent's control. This poses risks of misoperation, exposure to inappropriate content, and disruption of the parents' own use for work or social purposes. Moreover, when using webcams for live streaming or taking selfies, webcams are functionally limited, and high-performance webcams equivalent to a smartphone's rear camera are costly. If the smartphone already features a high-quality rear camera, replacing it with an external webcam solely for screen monitoring is not an ideal solution.

SUMMARY OF THE PRESENT INVENTION

An objective of the present invention is to provide a portable mobile phone screen-mirroring display, wherein the portable mobile phone screen-mirroring display is adapted to wirelessly connect to a mobile phone to receive audio-visual screen-mirroring signals from the mobile phone, thereby functioning as a portable viewing screen for the mobile phone. In this way, video viewing on the display screen without affecting normal use of the mobile phone, while ensuring that the content displayed on the viewing screen remains controllable by the mobile phone.

Another objective of the present invention is to provide a portable mobile phone screen-mirroring display, wherein the portable mobile phone screen-mirroring display is adapted to wirelessly connect to a mobile phone to receive audio-visual screen-mirroring signals from the mobile phone, thereby functioning as a portable shooting monitor for the mobile phone. This enables real-time monitoring of captured images through the shooting monitor when using a rear camera of the mobile phone for live streaming or self-portrait photography.

Another objective of the present invention is to provide a portable mobile phone screen-mirroring display, wherein the portable mobile phone screen-mirroring display is adapted to serve as either a portable viewing screen or shooting monitor for the mobile phone, thereby addressing the specific needs of multiple applications such as video watching, live streaming, photography, and online classes. Thus, this solution offers high cost-effectiveness and commercial value.

Another objective of the present invention is to provide a portable mobile phone screen-mirroring display, wherein the portable mobile phone screen-mirroring display comprises a processor module, and a display screen, a Wi-Fi module and a Bluetooth module communicatively connected to the processor module. The portable mobile phone screen-mirroring display is configured to automatically establish a Wi-Fi connection between the Wi-Fi module and the mobile phone based on a Bluetooth connection between the Bluetooth module and the mobile phone, and is further configured to receive audio-visual screen-mirroring signals from the mobile phone exclusively through the Wi-Fi module. In this way, the connection method of the portable mobile phone screen-mirroring display with the mobile phone via Wi-Fi is simplified while maintaining the privacy and security of the screen-mirroring content transmitted over the Wi-Fi connection.

Another objective of the present invention is to provide a portable mobile phone screen-mirroring display, wherein the Wi-Fi module audio-visual screen-mirroring signals from the mobile phone and transmits the audio-visual screen-mirroring signals to the processor module, and the processor module then controls the display screen to perform screen mirroring based on the received audio-visual screen-mirroring signals. As the portable mobile phone screen-mirroring display is configured to receive the audio-visual screen-mirroring signals exclusively through the Wi-Fi module from the mobile phone, thereby simplifying the programming required for the portable mobile phone screen-mirroring display to adapt to the built-in screen-mirroring protocols of different smartphone systems.

Another objective of the present invention is to provide a portable mobile phone screen-mirroring display, wherein the portable mobile phone screen-mirroring display further comprises an audio output module communicatively connected to the processor module. The processor module controls audio output from the audio output module based on the received audio-visual screen-mirroring signals. With the portable mobile phone screen-mirroring display configured to receive the audio-visual screen-mirroring signals exclusively through the Wi-Fi module from the mobile phone, thereby ensuring synchronization between images displayed on the display screen and audio output from the audio output module.

Another objective of the present invention is to provide a portable mobile phone screen-mirroring display, wherein the portable mobile phone screen-mirroring display is configured to transmit control commands generated by the processor module back to the mobile phone exclusively through the Bluetooth module. This ensures that the transmission paths for the audio-visual screen-mirroring signals and the control commands are independent, ensuring the stability and transmission efficiency of the audio-visual screen mirroring signal and control commands, thereby ensuring the image quality during screen mirroring performed by the portable mobile phone screen-mirroring display and to reduce the latency of screen mirroring performed by the portable mobile phone screen-mirroring display.

Another objective of the present invention is to provide a portable mobile phone screen-mirroring display, wherein the portable mobile phone screen-mirroring display is configured to generate the control commands at the processor module based on corresponding touch operations performed on the display screen and/or press operations performed on buttons. In this way, the portable mobile phone screen-mirroring display is further integrated with the functionalities of a Bluetooth touch panel and/or Bluetooth control buttons, thereby being capable of accommodating the specific needs of mobile phones in various application scenarios such as video playback, live streaming, photography, and online classes. With the portable mobile phone screen-mirroring display configured to transmit the control commands generated by the processor module back to the mobile phone exclusively through the Bluetooth module, this further simplifies the programming required for the portable mobile phone screen-mirroring display to adapt to the built-in Bluetooth control protocols of different smartphone systems.

Another objective of the present invention is to provide a portable mobile phone screen-mirroring display, wherein the portable mobile phone screen-mirroring display further comprises a microphone module communicatively connected to the processor module, wherein the processor module is configured to generate the control commands based on the recognition of audio signals captured by the microphone module, thereby enabling voice control of the mobile phone, and in usage scenarios where the portable mobile phone screen-mirroring display is relatively close to the user, such as long-distance self-portrait photography, this provides more sensitive and stable voice control compared to direct voice control through the mobile phone, while also reducing voice control latency.

Another objective of the present invention is to provide a portable mobile phone screen-mirroring display, wherein the processor module is further configured to transmit the audio signals captured by the microphone module back to the mobile phone through the Bluetooth module. In this way, the portable mobile phone screen-mirroring display further integrates the functionality of a Bluetooth microphone, and is capable of accommodating the audio pickup needs of the mobile phone in various application scenarios such as live streaming, photography, and online classes. This helps to simplify the programming required for the portable mobile phone screen-mirroring display to adapt to the built-in Bluetooth accessory protocols of different smartphone systems.

Another objective of the present invention is to provide a portable mobile phone screen-mirroring display, wherein the portable mobile phone screen-mirroring display has a back cover configured to be magnetically attachable, allowing the back cover to be magnetically attached to the back of a mobile phone, thereby enabling the portable mobile phone screen-mirroring display to display captured images on the back side of the mobile phone when using a rear camera of the mobile phone for photography.

To achieve at least one of the above objectives, according to one aspect of the present invention, a portable mobile phone screen-mirroring display is provided. The portable mobile phone screen-mirroring display is adapted to wirelessly connect with a mobile phone to receive audio-visual screen-mirroring signals from the mobile phone, thereby functioning as a portable viewing screen or portable shooting monitor for the mobile phone, which comprises:

A processor module, and a display screen, a Wi-Fi module and a Bluetooth module communicatively connected to the processor module, wherein the portable mobile phone screen-mirroring display is configured to receive audio-visual screen-mirroring signals from mobile phone exclusively through the Wi-Fi module, and to transmit control commands generated by the processor module back to the mobile phone exclusively through the Bluetooth module. Correspondingly, the Wi-Fi module receives the audio-visual screen-mirroring signals from the mobile phone and transmits the audio-visual screen-mirroring signals to the processor module, the processor module controls the display screen to perform screen mirroring based on the received audio-visual screen-mirroring signals.

In one embodiment, wherein the portable mobile phone screen-mirroring display is configured to generate the control commands at the processor module based on corresponding touch operations performed on the display screen.

In one embodiment, the portable mobile phone screen-mirroring display further comprises at least one button, and is configured to generate the control commands at the processor module based on press operations performed on the corresponding button.

In one embodiment, wherein the portable mobile phone screen-mirroring display is configured to generate the control commands at the processor module for triggering a camera shutter of the mobile phone based on press operations performed on at least one of the buttons.

In one embodiment, the processor module comprises a core processor and a microcontroller communicatively connected to the core processor, the buttons at least include a power button, wherein the power button is communicatively connected to the microcontroller, the microcontroller is configured to control a working state of the portable mobile phone screen-mirroring display by controlling the core processor based on a press operation performed on the power button.

In one embodiment, the buttons further include a screen rotation button communicatively connected to the core processor, wherein the core processor is configured to rotate an image displayed on the display screen based on the press operation performed on the screen rotation button.

In one embodiment, the portable mobile phone screen-mirroring display further comprises an audio output module communicatively connected to the processor module, the processor module controls the audio output from the audio output module based on the received audio-visual screen-mirroring signals.

In one embodiment, the portable mobile phone screen-mirroring display further comprises a microphone module communicatively connected to the processor module, the processor module is configured to generate the control commands based on recognition of the audio signals captured by the microphone module, thereby enabling voice control of the mobile phone.

In one embodiment, the processor module is further configured to transmit the audio signals captured by the microphone module back to the mobile phone through the Bluetooth module.

In one embodiment, the portable mobile phone screen-mirroring display is configured to automatically establish a Wi-Fi connection between the Wi-Fi module and the mobile phone based on a Bluetooth connection between the Bluetooth module and the mobile phone.

In one embodiment, the portable mobile phone screen-mirroring display comprises a housing, and a circuit board and a battery disposed within the housing, wherein the display screen is visibly arranged on one surface of the housing, the processor module is mounted on the circuit board, and the circuit board is electrically connected to the battery.

In one embodiment, the housing of the portable mobile phone screen-mirroring display has a back cover configured to be magnetically attachable, allowing the back cover to be magnetically attached to the back of the mobile phone, thereby enabling the portable mobile phone screen-mirroring display to display captured images on the back side of the mobile phone when using a rear camera of the mobile phone for photography.

According to another aspect of the present invention, a portable mobile phone screen-mirroring display is provided. The portable mobile phone screen-mirroring display is adapted to wirelessly connect with a mobile phone to receive audio-visual screen-mirroring signals from the mobile phone, thereby functioning as a portable viewing screen or portable shooting monitor for the mobile phone, which comprises:

A processor module, and a display screen, a Wi-Fi module and a Bluetooth module communicatively connected to the processor module, wherein the portable mobile phone screen-mirroring display is configured to receive audio-visual screen-mirroring signals from mobile phone exclusively through the Wi-Fi module, and to transmit control commands generated by the processor module back to the mobile phone exclusively through the Bluetooth module, and a Wi-Fi connection between the Wi-Fi module and the mobile phone is automatically established based on a Bluetooth connection between the Bluetooth module and the mobile phone. Correspondingly, the Wi-Fi module receives the audio-visual screen-mirroring signals from the mobile phone and transmits the audio-visual screen-mirroring signals to the processor module, the processor module controls the display screen to perform screen mirroring based on the received audio-visual screen-mirroring signals.

In one embodiment, the portable mobile phone screen-mirroring display further comprises a microphone module communicatively connected to the processor module, the processor module is configured to generate the control commands based on recognition of the audio signals captured by the microphone module, thereby enabling voice control of the mobile phone.

In one embodiment, wherein the portable mobile phone screen-mirroring display further comprises at least one button, and is configured to generate the control commands at the processor module for controlling a camera shutter of the mobile phone based on press operations performed on at least one of the buttons.

Further objects and advantages of the present invention will be fully understood through the following description and accompanying drawings.

DETAILED DESCRIPTION OF THE PREFERRED EMBODIMENT

Figure 1:
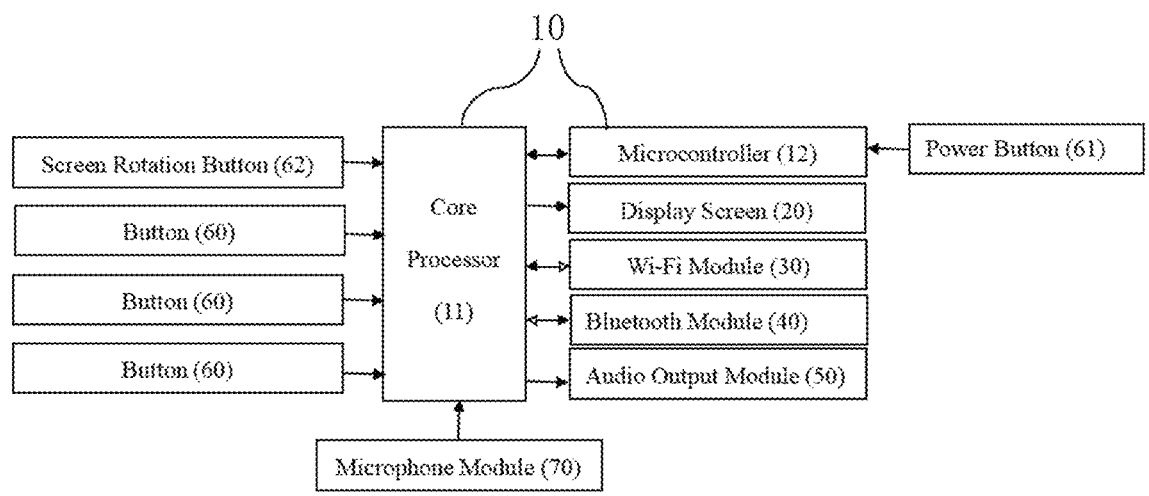
FIG. 1 is a schematic block diagram of a portable mobile phone screen-mirroring display according to one embodiment of the present invention.

The following description is used to disclose the present invention so that those skilled in the art can implement the present invention. The preferred embodiments in the following description are only examples, and those skilled in the art can think of other obvious variations. The basic principles of the present invention defined in the following description can be applied to other embodiments, modifications, improvements, equivalents, and other technical solutions without departing from the spirit and scope of the present invention.

Those skilled in the art should understand that in the disclosure of the present invention, terms such as 'longitudinal', 'transverse', 'upper', 'lower', 'front', 'rear', 'left', 'right', 'vertical', 'horizontal', 'top', 'bottom', 'inside', 'outside', etc., indicating orientation or positional relationships, are based on the orientation or positional relationships shown in the drawings. These are for the convenience of describing the present invention and simplifying the description, and do not indicate or imply that the referred device or component must have a specific orientation or be constructed and operated in a specific orientation, thus these terms should not be understood as limiting the present invention.

It should be understood that the term "a" should be interpreted to mean "at least one" or "one or more." In one embodiment, the number of an element can be one, while in another embodiment, the number of that element can be multiple. The term "a" should not be interpreted as a limitation on quantity.

The present invention provides a portable mobile phone screen-mirroring display, wherein the portable mobile phone screen-mirroring display is adapted to wirelessly connect with a mobile phone to receive audio-visual screen-mirroring signals from the mobile phone, thereby functioning as a portable viewing screen or portable shooting monitor for the mobile phone. When used as a portable viewing screen, the portable mobile phone screen-mirroring display allows video viewing without interfering with normal use of the mobile phone while ensuring that the content displayed on the viewing screen remains controllable by the mobile phone, and when used as a shooting monitor, the portable mobile phone screen-mirroring display enables real-time monitoring of captured images through the shooting monitor when using a rear camera of the mobile phone for live streaming or self-portrait photography.

Specifically, referring to FIG. 1 of the present specification, a schematic block diagram of the portable mobile phone screen-mirroring display is shown, wherein the portable mobile phone screen-mirroring display comprises a processor module (10), and a display screen (20), a Wi-Fi module (30) and a Bluetooth module (40) communicatively connected to the processor module (10), wherein the portable mobile phone screen-mirroring display is configured to receive audio-visual screen-mirroring signals from mobile phone exclusively through the Wi-Fi module (30), and to transmit control commands generated by the processor module (10) back to the mobile phone exclusively through the Bluetooth module (40). Correspondingly, the Wi-Fi module (30) receives the audio-visual screen-mirroring signals from the mobile phone and transmits the audio-visual screen-mirroring signals to the processor module (10), the processor module (10) controls the display screen (20) to perform screen mirroring based on the received audio-visual screen-mirroring signals. This ensures that the transmission paths for the audio-visual screen-mirroring signals and the control commands are independent, ensuring the stability and transmission efficiency of the audio-visual screen mirroring signal and control commands, thereby ensuring the image quality during screen mirroring performed by the portable mobile phone screen-mirroring display and to reduce the latency of screen mirroring performed by the portable mobile phone screen-mirroring display.

It should be understood that when the portable mobile phone screen-mirroring display is configured to receive audio-visual screen-mirroring signals exclusively through the Wi-Fi module (30) from the mobile phone, the transmission path of the audio-visual screen-mirroring signals is stable and singular, thereby simplifying the programming required for the portable mobile phone screen-mirroring display to adapt to the built-in screen-mirroring protocols of different smartphone systems.

Preferably, under the condition where the portable mobile phone screen-mirroring display is configured to receive audio-visual screen-mirroring signals exclusively through the Wi-Fi module (30), in order to further ensure the image quality of screen mirroring and to reduce the latency of screen mirroring, the Wi-Fi module (30) is configured to employ a Wi-Fi module that supports Wi-Fi 7.

Furthermore, the portable mobile phone screen-mirroring display also comprises an audio output module (50) communicatively connected to the processor module (10), wherein the processor module (10) controls the audio output from the audio output module (50) based on the received audio-visual screen-mirroring signals. In this way, under the condition where the portable mobile phone screen-mirroring display is configured to receive audio-visual screen-mirroring signals exclusively through the Wi-Fi module (30), the image displayed on the display screen (20) can remain synchronized with the audio output from the audio output module (50).

It should be understood that the audio-visual screen-mirroring signals formed based on the built-in screen-mirroring protocols in mobile phone systems typically contain synchronized audio information. Therefore, when the processor module (10) is configured to control the audio output module (50) to output audio based on the received audio-visual screen-mirroring signals, the separate audio information to be received through the Bluetooth module (40) is avoided, thereby preventing redundant data transmission and maintaining synchronization between the images displayed on the display screen (20) and the audio output from the audio output module (50).

Furthermore, the portable mobile phone screen-mirroring display further comprises at least one button (60), wherein the portable mobile phone screen-mirroring display is configured to generate the control commands at the processor module (10) based on corresponding touch operations performed on the display screen (20) and/or press operations performed on the corresponding button (60). In this way, the portable mobile phone screen-mirroring display is further integrated with the functionalities of a Bluetooth touch panel and/or Bluetooth control buttons, thereby being capable of accommodating the specific needs of mobile phones in various application scenarios such as video viewing, live streaming, photography, and online classes. With the portable mobile phone screen-mirroring display configured to transmit the control commands generated by the processor module (10) back to the mobile phone exclusively through the Bluetooth module (40), this further simplifies the programming required for the portable mobile phone screen-mirroring display to adapt to the built-in Bluetooth control protocols of different smartphone systems.

For example, the portable mobile phone screen-mirroring display is configured to generate the control commands at the processor module (10) for controlling a camera shutter of the mobile phone based on press operations performed on at least one of the buttons (60). In this way, the portable mobile phone screen-mirroring display integrates the functionality of a Bluetooth shutter button, thereby being capable of accommodating the remote shutter control needs of mobile phones in photography applications.

It should be understood that the built-in Bluetooth control protocols of different mobile phone systems usually include shutter control interfaces. Therefore, with the portable mobile phone screen-mirroring display configured to transmit the control commands generated by the processor module (10) back to the mobile phone exclusively through the Bluetooth module (40), this further simplifies the programming required for the portable mobile phone screen-mirroring display to adapt to the built-in Bluetooth control protocols of different smartphone systems.

Furthermore, the portable mobile phone screen-mirroring display further comprises a microphone module (70) communicatively connected to the processor module (10), wherein the processor module (10) is configured to generate the control commands based on recognition of the audio signals captured by the microphone module (70), thereby enabling voice control of the mobile phone, and in usage scenarios where the portable mobile phone screen-mirroring display is relatively close to the user, such as long-distance self-portrait photography, this provides more sensitive and stable voice control compared to direct voice control through the mobile phone, while also reducing voice control latency.

Specifically, the processor module (10) is further configured to transmit the audio signals captured by the microphone module (70) back to the mobile phone through the Bluetooth module (40). In this way, the portable mobile phone screen-mirroring display further integrates the functionality of a Bluetooth microphone, and is capable of accommodating the audio capture needs of the mobile phone in various application scenarios such as live streaming, photography, and online classes. This helps to simplify the programming required for the portable mobile phone screen-mirroring display to adapt to the built-in Bluetooth accessory protocols of different smartphone systems.

In other words, since the portable mobile phone screen-mirroring display is configured to receive audio-visual screen-mirroring signals from the mobile phone exclusively through the Wi-Fi module (30), and to transmit the control commands generated by the processor module (10) back to the mobile phone exclusively through the Bluetooth module (40), and further allows the audio signals captured by the microphone module (70) to be transmitted back to the mobile phone through the Bluetooth module (40). Therefore, in the communication process between the portable mobile phone screen-mirroring display of the present invention and the mobile phone, the downlink communication channel of the portable mobile phone screen-mirroring display is mainly provided by the Wi-Fi module (30), and the uplink communication channel of the portable mobile phone screen-mirroring display is mainly provided by the Bluetooth module (40), thereby ensuring the relative independence between the uplink communication channel and the downlink communication channel of the portable mobile phone screen-mirroring display, correspondingly ensuring the stability and transmission efficiency of the uplink and downlink communication channels of the portable mobile phone screen-mirroring display, thus ensuring the image quality during screen mirroring performed by the portable mobile phone screen-mirroring display and to reduce the latency of screen mirroring performed by the portable mobile phone screen-mirroring display.

Specifically, in the schematic block diagram of the portable mobile phone screen-mirroring display shown in FIG. 1, the processor module (10) comprises a core processor (11) and a microcontroller (12), wherein the microcontroller (12), the display screen (20), the Wi-Fi module (30), the Bluetooth module (40), the audio output module (50), the microphone module (70), and at least a portion of the buttons (60) are communicatively connected to the core processor (11), wherein the buttons (60) comprise at least a power button (61), and the power button (61) is communicatively connected to the microcontroller (12), the microcontroller (12) is configured to control a working state of the portable mobile phone screen-mirroring display by controlling the core processor (11) based on press operations performed on the power button (61). For example, but not limited to: in the powered-off state of the portable mobile phone screen-mirroring display, based on press operations performed on the power button (61), the microcontroller (12) controls the core processor (11) to be powered on and to activate the display screen (20); and in the powered-on state of the portable mobile phone screen-mirroring display, when the display screen (20) is lit, based on press operations performed on the power button (61), the microcontroller (12) controls the core processor (11) to turn off the display screen (20). In this way, based on the cooperative relationship between the core processor (11) and the microcontroller (12), the burden on the core processor (11) as the main controller is reduced, correspondingly ensuring the stability and operational efficiency of the core processor (11), and thus ensuring the operational stability of the portable mobile phone screen-mirroring display.

It should be understood that, as for the processor module (10), usually comprising a built-in or external oscillator unit and a memory unit, wherein the oscillator unit has various forms, including but not limited to crystal oscillators and oscillating circuits. Hence, as essential and conventional components of the processor module (10), the specific forms and arrangements of the oscillator unit and the memory unit are not limited by the present invention and are also not illustrated in the drawings.

It is worth mentioning that the portable mobile phone screen-mirroring display is preferably configured such that the Wi-Fi connection between the Wi-Fi module (30) and the mobile phone is automatically established based on the Bluetooth connection between the Bluetooth module (40) and the mobile phone. In this way, the connection method of the portable mobile phone screen-mirroring display with the mobile phone via Wi-Fi is simplified, and under the condition where the portable mobile phone screen-mirroring display is configured to receive the audio-visual screen-mirroring signals from the mobile phone exclusively through the Wi-Fi module (30), the privacy of the Wi-Fi connection between the portable mobile phone screen-mirroring display and the mobile phone is ensured, thereby ensuring the security of the screen-mirroring content.

Figure 2A:
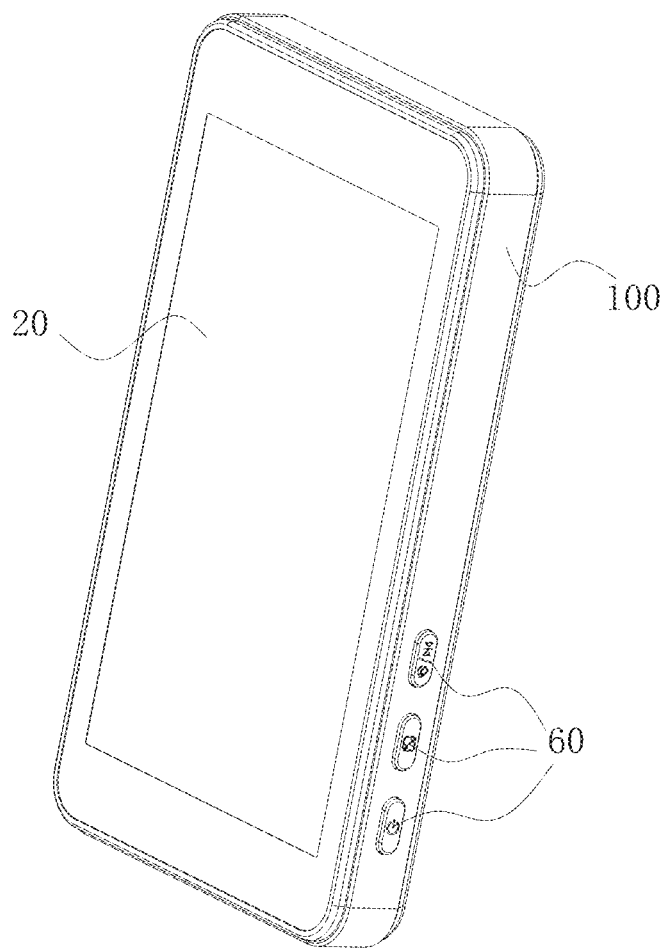
FIG. 2A is a schematic view of the physical structure of the portable mobile phone screen-mirroring display according to the above-described embodiment of the present invention.
Figure 2B:
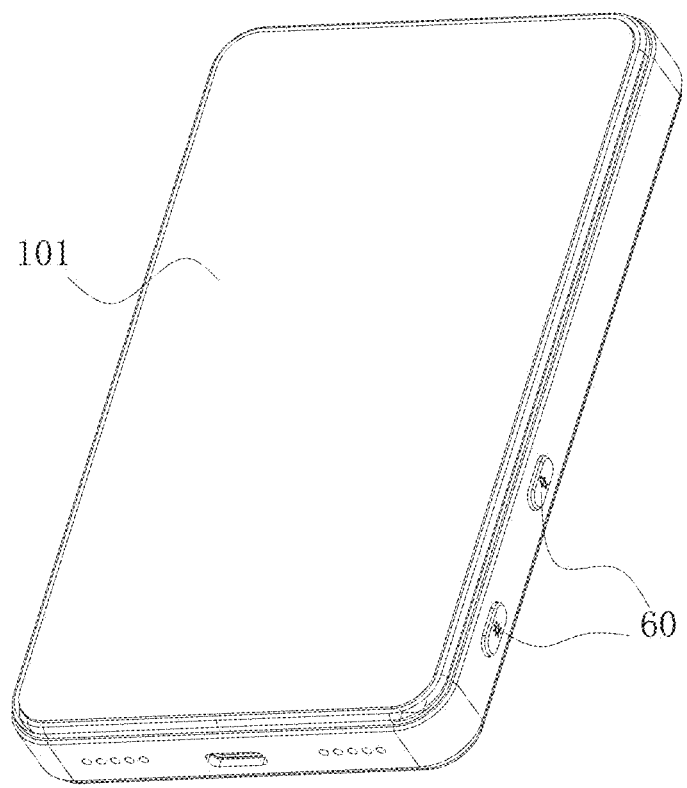
FIG. 2B is another schematic view of the physical structure of the portable mobile phone screen-mirroring display according to the above-described embodiment of the present invention.
Figure 2C:
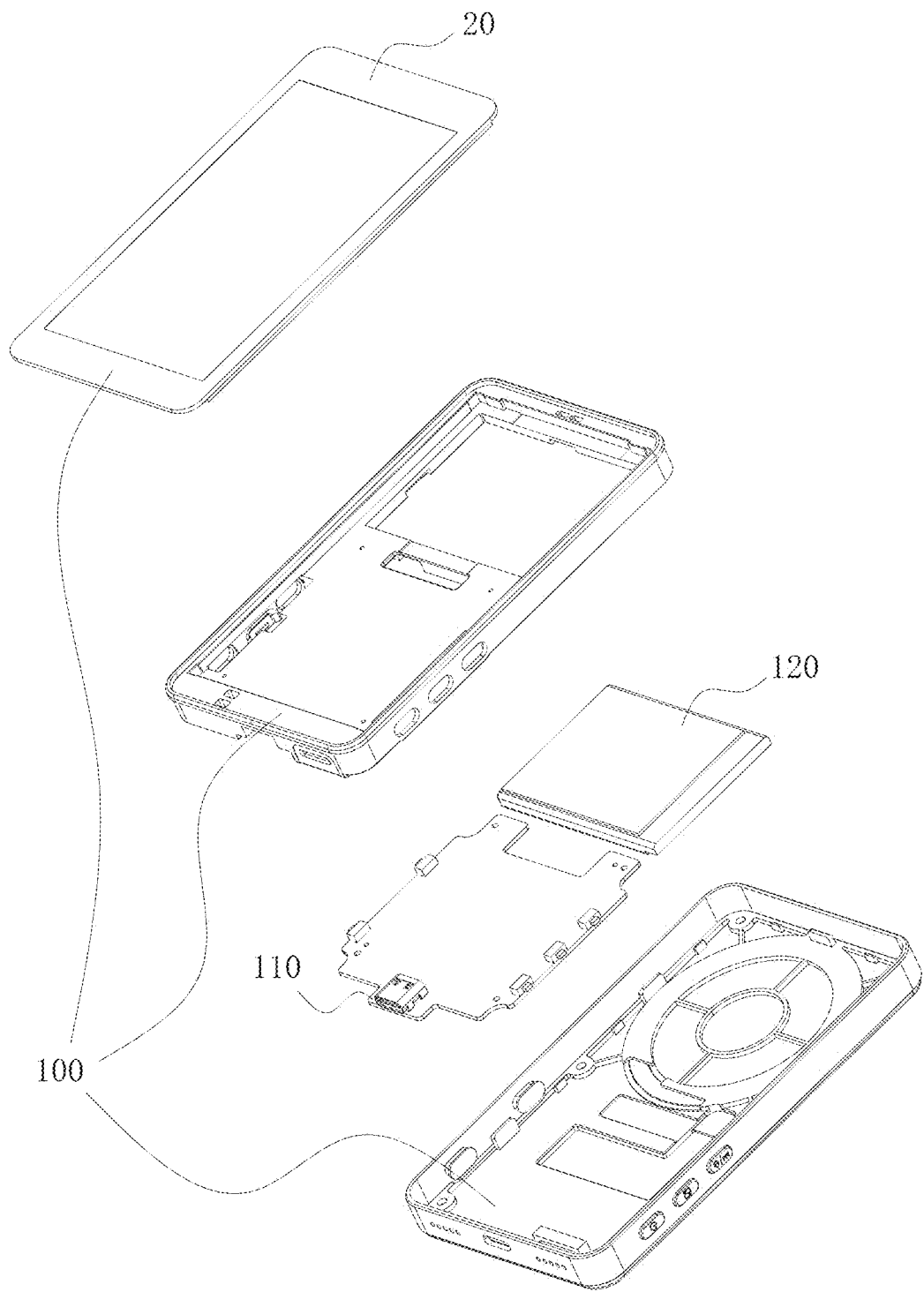
FIG. 2C is another schematic view of the physical structure of the portable mobile phone screen-mirroring display according to the above-described embodiment of the present invention.

Further referring to FIGS. 2A to 2C of the specification of the present invention, a schematic view is shown of a physical structure of the portable mobile phone screen-mirroring display corresponding to the block diagram shown in FIG. 1, wherein the portable mobile phone screen-mirroring display comprises a housing (100), the display screen (20) is visibly disposed on one surface of the housing (100), and a circuit board (110) and a battery (120) are disposed within the housing (100), wherein the processor module (10) is mounted on the circuit board (110), and the circuit board (110) is electrically connected to the battery (120).

It should be understood that any one of the Wi-Fi module (30), the Bluetooth module (40), the audio output module (50), and the microphone module (70) may be packed as an integral module and be integrally fixed to the circuit board (110), or may be connected to the circuit board (110) with a corresponding flexible cable, or, in a state where the module is not packed as an integral unit, may be partially fixed to the circuit board (110). For example, the audio output module (50) may optionally comprise a digital-to-analog conversion (DAC) chip, an audio power amplifier chip, and a speaker. Correspondingly, the DAC chip and/or the audio power amplifier chip may be selectively fixed to the circuit board (110), so that the audio output module (50) is partially fixed to the circuit board (110). Therefore, the structural forms of the Wi-Fi module (30), the Bluetooth module (40), the audio output module (50), and the microphone module (70), and their fixing methods to the circuit board (110) may vary, and the present invention does not limit these configurations and does not illustrate them in the drawings.

Figure 3:
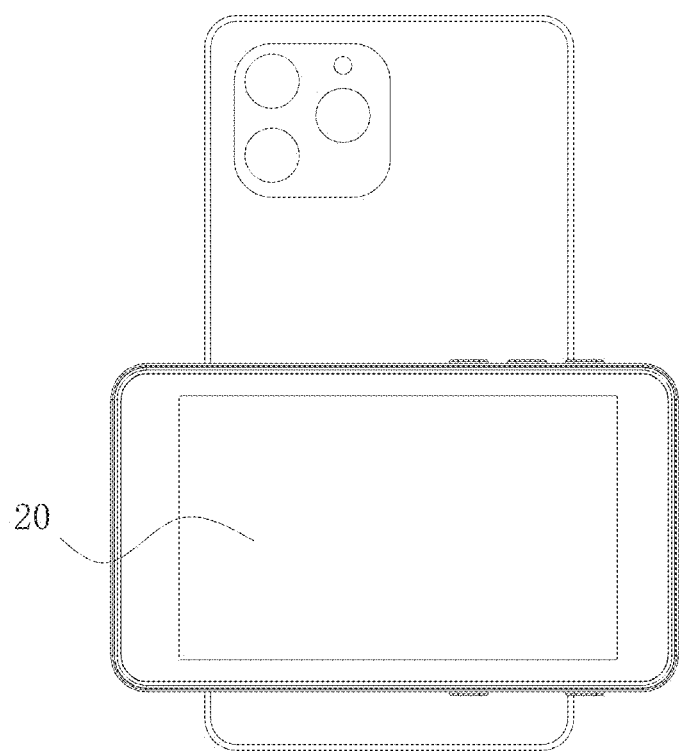
FIG. 3 is a schematic view illustrating a usage scenario of the portable mobile phone screen-mirroring display according to the above-described embodiment of the present invention.

Specifically, the housing (100) of the portable mobile phone screen-mirroring display has a back cover (101) configured to be magnetically attachable, allowing the back cover (101) to be magnetically attached to the back side of a mobile phone, corresponding to the usage scenario schematically shown in FIG. 3, thereby enabling the portable mobile phone screen-mirroring display to display captured images on the back side of the mobile phone when using a rear camera of the mobile phone for photography.

Further, corresponding to the usage scenario shown in FIG. 3, the buttons (60), also corresponding to FIG. 1, include a screen rotation button (62) communicatively connected to the core processor (11), wherein the core processor (11) is optionally configured to rotate an image displayed on the display screen (20) based on press operations performed on the screen rotation button (62).

It should be understood by those skilled in the art that the above embodiments are provided are merely exemplary, wherein features from different embodiments may be combined to create implementations that, while not explicitly illustrated in the drawings, would be readily apparent based on the disclosure of the present invention.

Those skilled in the art will understand that the embodiments and examples described above, as well as the drawings illustrating the principles of the invention, are merely illustrative and do not limit the invention. The objectives of the invention have been fully and effectively realized. The functions and structural principles of the invention have been shown and described in the embodiments, and without departing from these principles, the invention can be embodied in various forms and modifications.

What is claimed is:

1. A portable mobile phone screen-mirroring display, said portable mobile phone screen-mirroring display is adapted to wirelessly connect with a mobile phone to receive audio-visual screen-mirroring signals from said mobile phone and function as a portable viewing screen or a portable shooting monitor for said mobile phone, which comprising:
   a processor module;
   a display screen communicatively connected to said processor module;
   a Wi-Fi module communicatively connected to said processor module; and
   a Bluetooth module communicatively connected to said processor module;
   wherein said portable mobile phone screen-mirroring display is configured to receive said audio-visual screen-mirroring signals from said mobile phone exclusively through said Wi-Fi module, and to transmit control commands generated by said processor module back to said mobile phone exclusively through said Bluetooth module,
   and said Wi-Fi module receives said audio-visual screen-mirroring signals from said mobile phone and transmit said audio-visual screen-mirroring signals to said processor module, and said processor module controls said display screen to perform screen mirroring based on said received audio-visual screen-mirroring signals.

2. The portable mobile phone screen-mirroring display, as recited in claim 1, wherein said portable mobile phone screen-mirroring display is configured to generate said control commands at said processor module based on corresponding touch operations performed on said display screen.

3. The portable mobile phone screen-mirroring display, as recited in claim 2, wherein said portable mobile phone screen-mirroring display further comprises at least one button, and is configured to generate said control commands at said processor module based on press operations performed on said corresponding button.

4. The portable mobile phone screen-mirroring display, as recited in claim 3, wherein said portable mobile phone screen-mirroring display is configured to generate said control commands at said processor module for triggering a camera shutter of said mobile phone based on press operations performed of at least one of said buttons.

5. The portable mobile phone screen-mirroring display, as recited in claim 4, wherein said processor module comprises a core processor and a microcontroller communicatively connected to said core processor, said buttons at least include a power button, wherein said power button is communicatively connected to said microcontroller, said microcontroller is configured to control a working state of said portable mobile phone screen-mirroring display by controlling said core processor based on a press operation performed on said power button.

6. The portable mobile phone screen-mirroring display, as recited in claim 5, wherein said buttons further include a screen rotation button communicatively connected to said core processor, wherein said core processor is configured to rotate an image displayed on said display screen based on press operations performed on said screen rotation button.

7. The portable mobile phone screen-mirroring display, as recited in claim 5, wherein said portable mobile phone screen-mirroring display further comprises an audio output module communicatively connected to said processor module, said processor module controls audio output from said audio output module based on said received audio-visual screen-mirroring signals.

8. The portable mobile phone screen-mirroring display, as recited in claim 7, wherein said portable mobile phone screen-mirroring display further comprises a microphone module communicatively connected to said processor module, said processor module is configured to generate said control commands based on recognition of audio signals captured by said microphone module, thereby enabling voice control of said mobile phone.

9. The portable mobile phone screen-mirroring display, as recited in claim 8, wherein said processor module is further configured to transmit said audio signals captured by said microphone module back to said mobile phone through said Bluetooth module.

10. The portable mobile phone screen-mirroring display, as recited in claim 8, wherein said portable mobile phone screen-mirroring display is configured to automatically establish a Wi-Fi connection between said Wi-Fi module and said mobile phone based on a Bluetooth connection between said Bluetooth module and said mobile phone.

11. The portable mobile phone screen-mirroring display, as recited in claim 10, wherein said portable mobile phone screen-mirroring display comprises a housing, and a circuit board and a battery disposed within said housing, wherein said display screen is visibly arranged on one surface of said housing, said processor module is mounted on said circuit board, and said circuit board is electrically connected to said battery.

12. The portable mobile phone screen-mirroring display, as recited in claim 11, wherein said housing of said portable mobile phone screen-mirroring display has a back cover configured to be magnetically attachable, allowing said back cover to be magnetically attached to the back of said mobile phone, thereby enabling said portable mobile phone screen-mirroring display to display captured images on the back side of said mobile phone when using a rear camera of said mobile phone for photography.

13. The portable mobile phone screen-mirroring display, as recited in claim 4, wherein said portable mobile phone screen-mirroring display further comprises a microphone module communicatively connected to said processor module, said processor module is configured to generate said control commands based on recognition of audio signals captured by said microphone module, thereby enabling voice control of said mobile phone.

14. The portable mobile phone screen-mirroring display, as recited in claim 13, wherein said processor module is further configured to transmit said audio signals captured by said microphone module back to said mobile phone through said Bluetooth module.

15. The portable mobile phone screen-mirroring display, as recited in claim 13, wherein said portable mobile phone screen-mirroring display is configured to automatically establish a Wi-Fi connection between said Wi-Fi module and said mobile phone based on a Bluetooth connection between said Bluetooth module and said mobile phone.

16. The portable mobile phone screen-mirroring display, as recited in claim 15, wherein said portable mobile phone screen-mirroring display comprises a housing, and a circuit board and a battery disposed within said housing, wherein said display screen is visibly arranged on one surface of said housing, said processor module is mounted on said circuit board, and said circuit board is electrically connected to said battery.

17. The portable mobile phone screen-mirroring display, as recited in claim 16, wherein said housing of said portable mobile phone screen-mirroring display has a back cover configured to be magnetically attachable, allowing said back cover to be magnetically attached to the back of said mobile phone, thereby enabling said portable mobile phone screen-mirroring display to display captured images on the back side of said mobile phone when using a rear camera of said mobile phone for photography.

18. A portable mobile phone screen-mirroring display, said portable mobile phone screen-mirroring display is adapted to wirelessly connect with a mobile phone to receive audio-visual screen-mirroring signals from said mobile phone and function as a portable viewing screen or a portable shooting monitor for said mobile phone, which comprising:
   a processor module;
   a display screen communicatively connected to said processor module;
   a Wi-Fi module communicatively connected to said processor module; and
   a Bluetooth module communicatively connected to said processor module;
   wherein said portable mobile phone screen-mirroring display is configured to receive said audio-visual screen-mirroring signals from said mobile phone exclusively through said Wi-Fi module, and to transmit control commands generated by said processor module back to said mobile phone exclusively through said Bluetooth module, and a Wi-Fi connection between said Wi-Fi module and said mobile phone is automatically established based on a Bluetooth connection between said Bluetooth module and said mobile phone, and said Wi-Fi module receives said audio-visual screen-mirroring signals from said mobile phone and transmit said audio-visual screen-mirroring signals to said processor module, and said processor module controls said display screen to perform screen mirroring based on said received audio-visual screen-mirroring signals.

19. The portable mobile phone screen-mirroring display, as recited in claim 18, wherein said portable mobile phone screen-mirroring display further comprises a microphone module communicatively connected to said processor module, said processor module is configured to generate said control commands based on recognition of audio signals captured by said microphone module, thereby enabling voice control of said mobile phone.

20. The portable mobile phone screen-mirroring display, as recited in claim 19, wherein said portable mobile phone screen-mirroring display further comprises at least one button, and is configured to generate said control commands at said processor module for controlling a camera shutter of said mobile phone based on press operations performed on at least one of said buttons.

\* \* \* \* \*